United States Patent
Meyer (10) Patent No.: US 10,728,586 B2
(45) Date of Patent: *Jul. 28, 2020

(54) SYSTEM AND METHOD FOR CONTROLLING MEDIA CONTENT CAPTURE FOR LIVE VIDEO BROADCAST PRODUCTION

(71) Applicant: GVBB HOLDINGS S.A.R.L., Luxembourg (LU)

(72) Inventor: Charles S. Meyer, Crystal Bay, NV (US)

(73) Assignee: GVBB HOLDINGS S.A.R.L., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 16/594,942

(22) Filed: Oct. 7, 2019

(65) Prior Publication Data

US 2020/0145700 A1   May 7, 2020

Related U.S. Application Data (63) Continuation of application No. 15/880,988, filed on Jan. 25, 2018, now Pat. No. 10,440,403.
(Continued)

(51) Int. Cl.
*H04N 21/2187* (2011.01)
*H04N 5/268* (2006.01)
(Continued)

(52) U.S. Cl.
CPC ......... *H04N 21/2187* (2013.01); *H04N 5/268* (2013.01); *H04N 21/21805* (2013.01);
(Continued)

(58) Field of Classification Search
CPC ......... H04N 21/2187; H04N 21/23418; H04N 21/21805; H04N 21/64322; H04N 21/262;
(Continued)

(56) References Cited

U.S. PATENT DOCUMENTS 8,395,711 B2 * 3/2013 Oz ........................ H04N 5/272
348/722
10,440,403 B2 * 10/2019 Meyer .............. H04N 21/23418
(Continued)

FOREIGN PATENT DOCUMENTS

WO     2014191990 A1   12/2014

OTHER PUBLICATIONS

Haibo et al., "Image Sequence Coding at Very Low Bitrates: A Review," IEEE Transactions on Image Processing, pp. 589-609, Sep. 1994.
(Continued)

*Primary Examiner* — Junior O Mendoza
(74) *Attorney, Agent, or Firm* — Arent Fox LLP (57) ABSTRACT

A system and method is provided for minimizing delay time for controlling media content capture during live video broadcast production. The system includes a video production receiver that receives media content streams from one or more cameras that includes live media content captured by the cameras and encoded in a first encoding format. Moreover, a multi-view interface displays the media content and a video production controller generates control instructions based on inputs to the interface to change operation of the cameras capturing the respective media content. A camera controller is included that transmits the generated control instructions to the cameras to change the operation for capturing the respective media content. Moreover, the video production controls production of a live video stream (Continued)

for video broadcast production using media content that is captured from the cameras and that is encoded in a second encoding format different than the first encoding format.

31 Claims, 6 Drawing Sheets

Related U.S. Application Data (60) Provisional application No. 62/451,477, filed on Jan. 27, 2017.

(51) Int. Cl.
    *H04N 21/242*     (2011.01)
    *H04N 21/218*     (2011.01)
    *H04N 21/8547*    (2011.01)
    *H04N 21/234*     (2011.01)
    *H04N 21/2343*    (2011.01)
    *H04N 21/262*     (2011.01)
    *H04N 21/643*     (2011.01)
    *H04N 21/222*     (2011.01)

(52) U.S. Cl.
    CPC ..... *H04N 21/222* (2013.01); *H04N 21/23418* (2013.01); *H04N 21/234363* (2013.01); *H04N 21/242* (2013.01); *H04N 21/262* (2013.01); *H04N 21/64322* (2013.01); *H04N 21/8547* (2013.01)

(58) Field of Classification Search
    CPC ....... H04N 21/234363; H04N 21/8547; H04N 21/222; H04N 5/268; H04N 21/242
    See application file for complete search history.

(56) References Cited

U.S. PATENT DOCUMENTS

| | | |
|---|---|---|
| 2011/0202967 A1 | 8/2011 | Hecht et al. |
| 2012/0320196 A1 | 12/2012 | Overton et al. |
| 2014/0248031 A1* | 9/2014 | Griggs ................. H04H 60/06 386/230 |
| 2014/0270687 A1 | 9/2014 | Jannard et al. |
| 2014/0320662 A1 | 10/2014 | McNamee et al. |
| 2016/0104510 A1 | 4/2016 | Tamir et al. |
| 2017/0026619 A1 | 1/2017 | Kosseifi et al. |
| 2017/0164062 A1 | 6/2017 | Abramov et al. |

OTHER PUBLICATIONS

International Search Report & Written Opinion issued in PCT/EP2018/052023 dated Mar. 14, 2018.

* cited by examiner

SYSTEM AND METHOD FOR CONTROLLING MEDIA CONTENT CAPTURE FOR LIVE VIDEO BROADCAST PRODUCTION

CROSS REFERENCE TO RELATED APPLICATIONS

The present application is a continuation of U.S. patent application Ser. No. 15/880,988, filed Jan. 26, 2018, which claims priority to U.S. Provisional Patent Application No. 62/451,477, filed Jan. 27, 2017, the entire contents of each of which are hereby incorporated by reference in the entirety.

TECHNICAL FIELD

The present disclosure generally relates to video and media production, and, more particularly, to a system and method for bending time of live production.

BACKGROUND

Live television broadcasting typically involves capturing media content from a live scene (e.g., a sports venue, news broadcast, etc.), transmitting the captured content to a remote production facility where the video and audio signals are managed by production switchers, and then encoding the signals for transport to a distribution network. Each step in this process involves a certain level of delay, which, as a result, means that live television broadcasts today are far from being actually "live" or in "real-time". For example, typical transmission delay times can range from a few seconds to tens of seconds, which is the time delay between when media content is captured to when a program is transmitted and ultimately viewed by the end consumer. Moreover, this delay can be variable. For example, if an end consumer watches the same program on a tablet, there will be a different delay than if the consumer watches it on a monitor fed by an set-top box ("STB"), or yet different again from a monitor fed by an over-the-air signal using ATSC ("Advanced Television Systems Committee") transmission, as one example.

Figure 1:
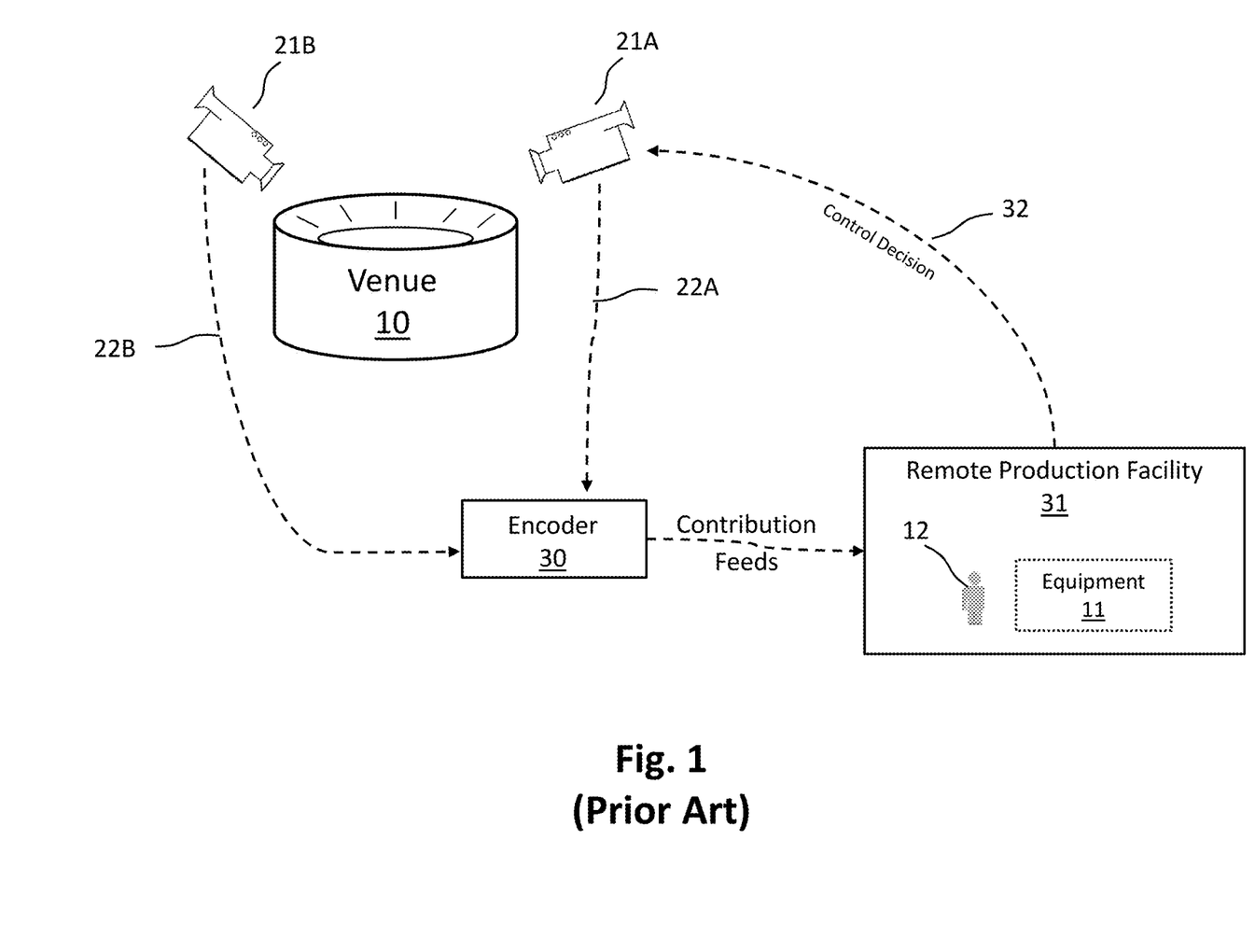
FIG. 1 illustrates a block diagram of a conventional system for producing a live television broadcast.

FIG. 1 illustrates a block diagram of a conventional system for producing a live television broadcast. As shown, the system can include a plurality of cameras 21A and 21B (two cameras are shown, but there can be multiple media streams generated by cameras) that capture media content from a venue 10 (e.g., a sports venue) and provide media streams 22A and 22B to a local encoder 30. The encoder 30 in turn encodes the media streams and provides the media as contribution feeds to a remote production facility 31 using satellite communication, for example. The production facility 31 will typically include video production equipment 11 that can be composed of production switches, controllers, processors, timing modules, a codec, and other equipment provided to process the incoming media streams for a television broadcast production. Furthermore, a technical director 12 can be located at the remote production facility 31 to control the video switcher(s) and make editorial and artistic decisions for the video production.

One significant technical problem with this arrangement is limited available bandwidth at venues to transmit the contribution feeds to the remote production facility. For example, at many venues, the available bandwidth may only be 1 GbE, for example. As a result, broadcast production will necessarily be limited to a minimum number of media streams that can provided by cameras 21A and 22B and may even be limited in the resolution of the video production that can be transmitted to the facility. For example, encoded high definition (HD) signals may consume too much bandwidth and create unacceptable latency periods. Accordingly, the broadcast system shown in FIG. 1 is quite limited in video production capabilities for live broadcast and cannot handle many cameras and/or incoming media streams.

Figure 2:
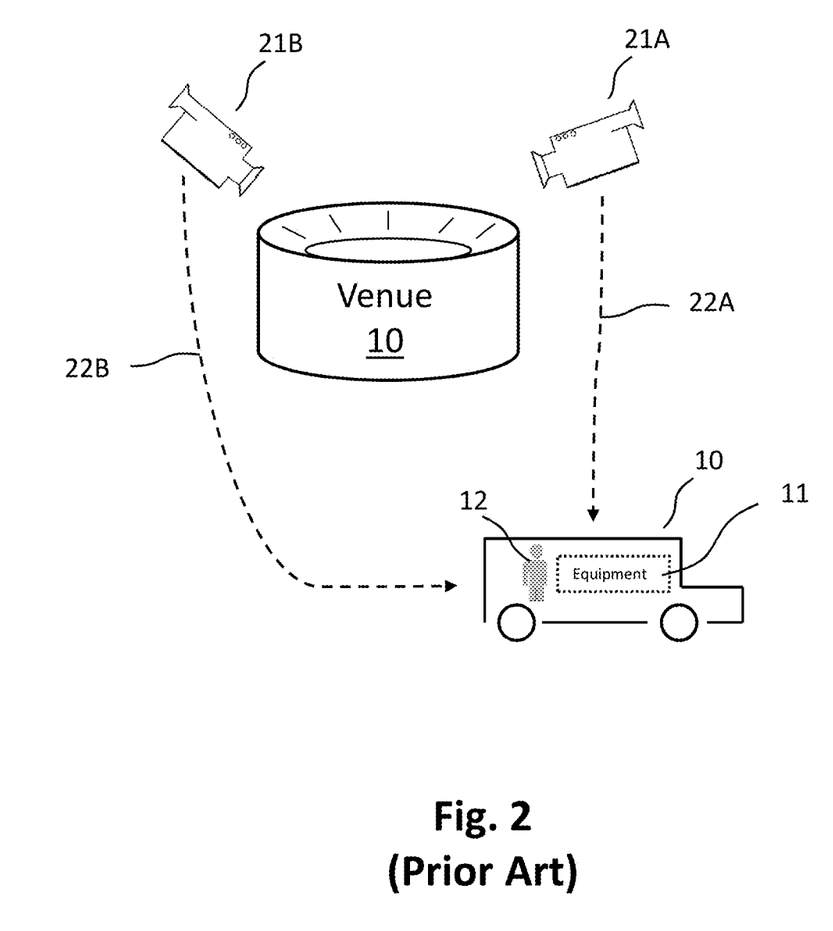
FIG. 2 illustrates a block diagram of another system for producing a conventional live television broadcast.

FIG. 2 illustrates a block diagram of another system for producing a conventional live television broadcast. Quite simply, for a large event like the Super Bowl or the Olympics, a television network may move both the video production equipment 11 and technical director 12 to the location of the venue 10 using a production truck 10, for example. However, this arrangement is also not ideal from a live video production perspective. For example, it is difficult and costly to move a large portion of the production crew including the technical director 12 to the venue. Moreover, the technical director 12 may have difficulty within the small confines of the truck 10 viewing the many media streams from the various cameras and manage/control the video switcher accordingly.

In either conventional system, the technical director 12 will typically operate the video switcher (and associated devices) and also serve as the chief of the production crew. Using the video switcher, the technical director 12 will switch video sources and also perform live digital effects and transitions, and insert prerecorded material, graphics and titles. In live video broadcast productions, the technical director 12 must coordinate the production and make rapid decisions. Thus, referring back to the configuration shown in FIG. 1, if the technical director 12 is located in a production control room of the remote production facility 31, the technical director 12 will often issue control decisions 32 that are fed back to cameras 21A and/or 21B to adjust the capture of media content, such as shading, video capture angles, etc. However, this control process creates further time delay in the video broadcast.

Figure 3:
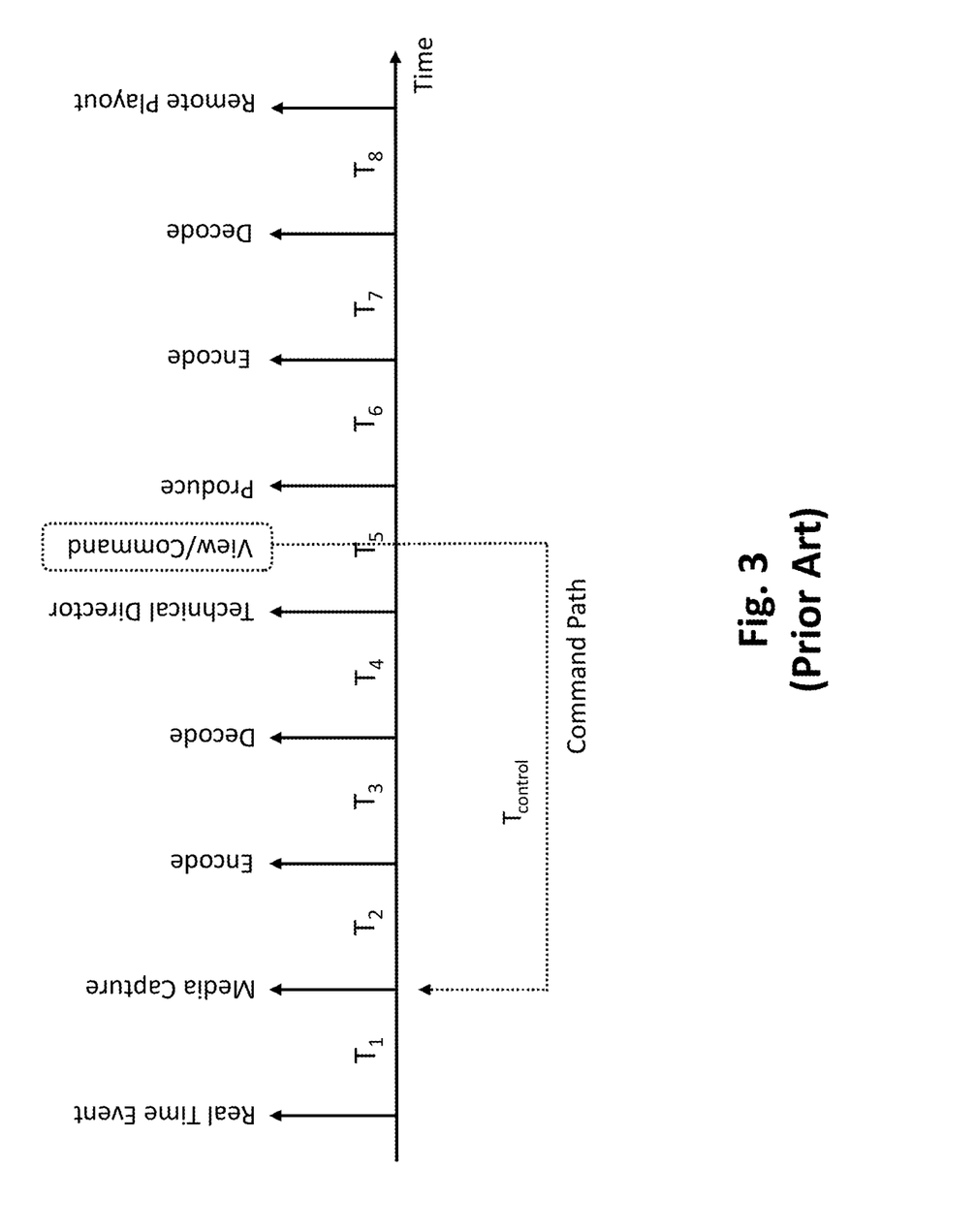
FIG. 3 illustrates a timing diagram of a conventional system for producing a live television broadcast.

Specifically, FIG. 3 illustrates a timing diagram of a conventional system for producing a live television broadcast. Time is shown along the X axis with the starting point in time being the real time event, which would be from a perspective of a person actually attending the sporting event at the venue 10, for example. Albeit small, there will even be a first delay $T_1$ from when light is captured by the camera lens and the pixel data is output. Moreover, as further shown, there are delays at each stage of the process. For example, there is a second delay $T_2$ from the camera(s) to the encoder 30 and a third delay $T_3$ when the signal is decoded at the remote production facility 31 before each media stream can be presented to the technical director after a fourth delay $T_4$. Although each delay is shown as being identical, it should be appreciated that the delays will vary according to bandwidth constraints and other propagation delays, such as device processing, conductor impedance of network links, and the like.

As described above, the technical director 12 can then operate the video switcher to issue control commands back to the local equipment (e.g., cameras 21A and 21B) at the venue 10. However, these command signals will also experience an effective delay $T_{control}$ when they are fed back to the devices. As further shown, each subsequent step of production, encoding at the production facility, decoding (by a STB, for example) and ultimate playout by an end consumer device each experiences an additional delay. However, the time delay $T_{control}$ is unacceptable from the consuming perspective as the technical director's editorial decisions will not be based on the actual live events (in real time or close thereto), but only after viewing a delayed image of the events. This results in uncertainty, and missing certain actions during the event, which then detracts from the end consumer's experience.

Thus, a live video broadcasting environment is needed that exploits virtualization techniques so that the end consumer is provided with the illusion that the live event is being produced in real time.

SUMMARY

Accordingly, a system and method is disclosed herein that "bends" time of live production. More particularly, the system and method disclosed herein exploits time shifting at the point of origination where cameras capture media in real time, but all media streams are presented coherently to the creative talent (e.g., a technical director) with as short a delay as possible, and preferably, only a few frames.

Effectively, the production environment provided by the disclosed system and method is a proxy of live, but so close to real time it is perceived as live. Moreover, the use of video optimized equipment and leased data services provides the ability to generate the proxy environment, with a very short delay, and also provides the ability for the video production optimized data center to be reused by many different events and at many different times. By using the proxy environment, final live video broadcast production can occur with an additional delay at a generic data center, which can save costs and provide wider scale of resources. Moreover, the disclosed system and method is implemented in order to co-locate final transmission with final production enabling cloud streaming distribution.

In an exemplary embodiment, the disclosed system effectively provides a true cloud based data center which can then provide a proxy back to the original production control center, which would be equivalent to a typical broadcast, or satellite, turn around. In the case of satellite, it will be faster while in the case of a tower, the turnaround delay will be slower, but only by a few hundred milliseconds. Thus, using emerging, low latency streaming technologies enables the production engine to reside in a true cloud, not just a private cloud. As a result, the exemplary system and method provides for the once "on-site production" control room (e.g., a production truck described above serving as both production engine and control room) to become both a virtualized control room, operating with proxies and minimal latency, and a virtualized production engine, operating with high quality media, albeit longer delay than the control room. Therefore, either the control room or the production engine, can be located anywhere provided the delays associated with original content delivery and control decision responsiveness are acceptable.

Thus, an exemplary system as disclosed herein is provided for live video broadcast production. In one aspect, the system includes a plurality of cameras configured to capture media content of a live event at a venue and generate respective media streams. Moreover, at least one encoder can be coupled to the plurality of cameras and is configured to encode the plurality of media streams using object based analysis and to generate respective high speed media proxies for the received plurality of media streams. In addition, the system can include a control center that is configured to receive the high speed media proxies. The control center can include a multi-view interface configured to display proxy content corresponding to the media streams generated by the plurality of cameras, respectively, and a video switcher controller coupled to the multi-view interface and being configured to receive at least one control instruction from a technical director of the live video broadcast production, where the at least one control instruction is transmitted to at least one of the plurality of cameras, or camera operators, to control operation thereof. Finally, the system can include video production equipment, including time alignment and processing components, configured to receive media signals from the at least one encoder and alignment commands from the control center. In this embodiment, the video production equipment is configured to align the plurality of received media signals using time stamps included therein, and the time aligned command from the control center to produce a live video broadcast for transmission to a plurality of end consumer devices.

In another exemplary aspect, a system is provided for minimizing delay time for controlling media content capture during live video broadcast production. The system includes a video production receiver that receives media content streams from one or more cameras that includes live media content captured by the cameras and encoded in a first encoding format. Moreover, a multi-view interface displays the media content and a video production controller generates control instructions based on inputs to the interface to change operation of the cameras capturing the respective media content. A camera controller is included that transmits the generated control instructions to the cameras to change the operation for capturing the respective media content. Moreover, the video production controls production of a live video stream for video broadcast production using media content that is captured from the cameras and that is encoded in a second encoding format different than the first encoding format.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Certain aspects of video production systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions and algorithms described herein may be implemented in hardware, software, or any combination thereof. If implemented in software, the functions may be stored on or encoded as one or more instructions or code on a computer-readable medium. Computer-readable media may include transitory or non-transitory computer storage media for carrying or having computer-executable instructions or data structures stored thereon. Both transitory and non-transitory storage media may be any available media that can be accessed by a computer as part of the processing system. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer. Further, when information is transferred or provided over a network or another communications connection (either hardwired, wireless, or combination thereof) to a computer, the computer or processing system properly determines the connection as a transitory or non-transitory computer-readable medium, depending on the particular medium. Thus, any such connection is properly termed a computer-readable medium. Combinations of the above should also be included within the scope of the computer-readable media. Non-transitory computer-readable media excludes signals per se and the air interface.

Figure 4A:
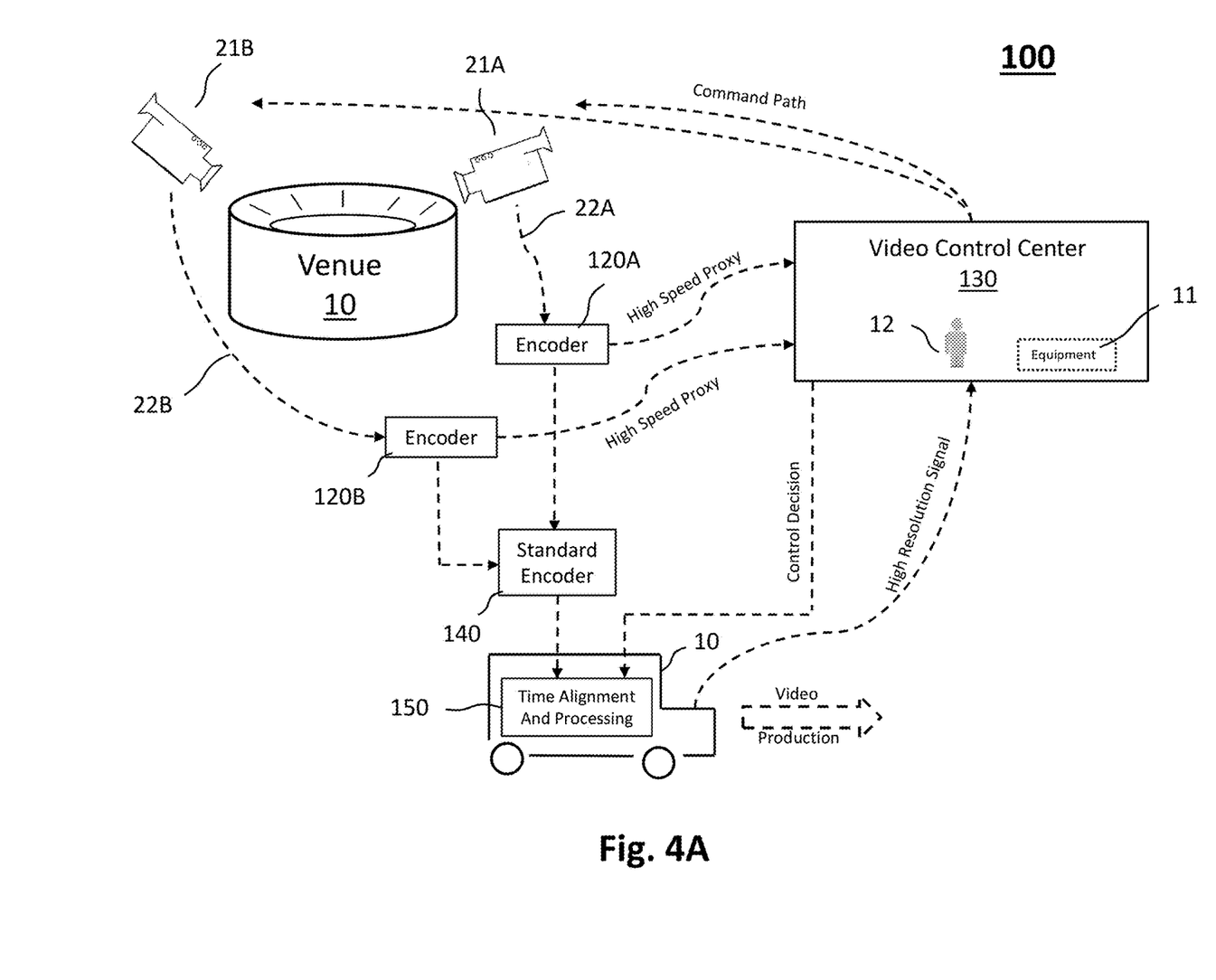
FIG. 4A illustrates a block diagram of a system for controlling media content capture for live television production according to an exemplary embodiment.

FIG. 4A illustrates a block diagram of a system for controlling media content capture for live television production according to an exemplary embodiment. As shown, certain components illustrated in system 100 correspond to components utilized in existing broadcast production environments as described above. For example, a plurality of cameras (e.g., cameras 21A and 21B) are provided to capture media content at a venue 10, such as a sports venue. Although only two cameras are shown, it should be appreciated that tens or even hundreds of media streams can be generated at the venue 10. Moreover, while the cameras 21A and 21B as shown as the exemplary media capture devices, one or more of these devices could also include microphones or other types of media originating devices, for example, configured to capture audio data from the live event, in one exemplary aspect. Moreover, the technical director 12 can be located at a remote control center 130 that can include certain video production equipment 11, including a video switcher, for example.

According to the exemplary embodiment, the media streams of the captured media content, which can include image data, graphics and/or replays, for example, generated by the cameras 21A and 22B (and possibly other media capture devices) are provided to one or more encoders 120A and 120B. Although a pair of encoders 120A and 120B are shown as communicatively coupled to cameras 21A and 22B, respectively, a single encoder can be provided to encode multiple data streams according to an alternative aspect. In general, encoders 120A and 120B can be considered broadcast control encoders in that they are configured to encode the data streams from the plurality of cameras 21A and 21B in a first encoding format, such as having a first resolution, for example, to generate high speed proxy signals. Typically, these high speed proxy signals will include the encoded media content that is suitable for broadcast production control, but not in a format suitable video broadcast production that is presented on consumer devices. The details of which will be explained below, but the design for encoding the media content in a first encoding format enables higher speeds of transmission than if the captured content is transmitted in a format (e.g., high definition or 4K resolution) suitable for consumption by end users.

Thus, in an exemplary aspect, the encoders 120A and 120B can be codec devices configured to encode the video data (i.e., the video streams 22A and 22B) into data packets for transmission over IP in the media processing network. More particularly, the encoders 120A and 120B are configured to generate high speed proxy signals that are fed to the video control center 130 where they can be decoded and presented to the technical director 12. In other words, unlike conventional broadcast environments, the encoders 120A and 120B are configured to generate low latency proxy streams that consume minimal bandwidth and, therefore, can be provided to the technical director 12 with minimal latency. Preferably, the high speed encoding by encoders 120A and 120B should be based on a much lower resolution image (compared with the final high resolution output), and then encoded using intra frame coding. For example, the encoding can be based on standard-definition television resolution, running at 270 Mb/s, and Q-CIF (quarter common intermediate format) in one exemplary aspect, for example. This pre-scale of media followed by encoding compression using H.264 and/or H.265 (HVEC) compression, can provide significant reduction in bandwidth consumption, which facilitates the transmission of the high speed media proxies.

In one exemplary embodiment, the high speed proxy streams can be transmitted using existing streaming technologies over the Internet, cloud, etc. For example, it is contemplated that in one embodiment, technologies such as Aspera's Fasp or ZiXi streaming, can be implemented to manage network traffic across the Internet, providing minimal latency such as 100 to 200 millisecond. Advantageously, these transmission technologies are fast enough to stream either lightly compressed media, such as the proxy streams, or heavily compressed media to a cloud computing resource for video production, if desired.

Furthermore, according to an exemplary embodiment, the encoders 120A and 120B (e.g., high speed encoders) are configured to generate the high speed proxy signals as standard or low resolution signals. In another embodiment, the cameras 21A and/or 21B or the encoders 120A and 120B can perform object based analysis of the objects (e.g., people, players, etc.) in the captured media content and provide a real-time, ultra-low bandwidth, and, therefore, low latency proxy signal to the video control center 130. In this aspect, the received information (i.e., the high speed media proxies) can be presented to the technical director 12 can be presented on a multi-view interface at the control center in a first resolution that corresponds to first encoding format of the generated media streams. For example, the content can be presented on the interface as avatars that are rendered on the equipment interfaces/monitors based on their spatial orientation and relative motion, which can be continuously observed. For example, each media stream can be rendered as part of a workstation having an interface with a multi-viewer display with integrated tally. As such, the system can generate simultaneous proxy content that can be remotely viewed and controlled. Thus, the technical director 12 can make the control decisions based on this rendering using the video switcher controller.

In addition, video production equipment 11 located at the video control center 130 can be operated by the user (e.g., the technical director 12) to control the operation of the plurality of cameras 21A and 21B to control media capture content. For example, the video production equipment 11 can include a video switch controller coupled to the multi-view interface that receive control instructions generated from a user input via the multi-view interface to control capture of the media content. Thus, as further shown, controls are transmitted back to the cameras 21A and 21B via command paths, which reflect the editorial and artistic decisions made by the technical director 12. However, unlike conventional systems that consume significant bandwidth, and, thus, experience unacceptable delay transmitting media streams to the remote production facility, the disclosed system 100 presents the technical director 12 with the necessary media stream proxies with minimal signal delay, such as 100 millisecond or 200 milliseconds, or less, for example. As a result, the technical director 12 will be able to make the artistic and editorial decisions using the video switcher, much closer to real time.

Thus, according to an exemplary aspect, the video production equipment 11 can include, for example, a video production receiver that receives the encoded media content streams (e.g., the high speed proxies) from the encoders 120A and 120B coupled to the field cameras, where the encoded media content streams include live media content captured by the cameras and that is encoded in the first high speed encoding format. Moreover, the video production equipment 11 includes the multi-view interface that displays the captured media content from media content streams based on the first encoding format (e.g., in a first resolution as discussed above). The video production equipment 11 can further include a video production controller that generates the control instructions, as discussed above, that are based on inputs (e.g., by the technical director 12) to the multi-view interface in order to make on the fly changes to control and modify the operation of the cameras during the capture of the media content at the live event, such as camera control operations like zoom, pan, or the like, as would be appreciated to one skilled in the art. Furthermore, the video production equipment 11 can also include a camera controller (or content capture controller) that in turn transmits the generated control instructions to the cameras (or operators of the cameras) that control and change the operation for capturing the media content. In addition, as further described below, the video production controller of the video production equipment 11 controls production of the live video stream for video broadcast production using the media content that is captured from the cameras and that is encoded in the second encoding format, which is different than the first encoding format and is suitable for video broadcast production to end consumer devices.

In any event, as further shown in FIG. 4A, the system 100 includes a standard encoder 140 (preferably located at the venue 10) that is coupled to encoders 120A and 120B, which can provide high quality signals (e.g., high definition, 4K resolution, etc.) for the production engine in the production environment. For example, the standard encoder 140 can be a broadcast production encoder that encodes, as a video broadcast media streams, the respective media stream generated by the plurality of cameras, which are controlled by the control instructions, for example, with the video broadcast media stream being encoded in a second encoding format at a second resolution higher than the first resolution used for the high speed media proxies.

Moreover, the production environment (e.g., the production truck 10) can separately feed back to the video control center 130 a high resolution signal that will reflect editorial decisions previously made by the technical director 12 using the low bandwidth, high speed proxy signals. Accordingly, the high resolution signal, or more typically signals, can arrive at the video production engine(s), with the correct mutual time alignment, and now latency is irrelevant. In one aspect, the high resolution signals can be encoded as contribution feeds and the encoder 140 may encode video and audio data using existing video compression techniques, such as, for example, high efficiency video coding ("HEVC"), MPEG-4, or the like using high level high profile settings, such as 4:2:2 10 bit encoding. In a second aspect, the audio and video maybe encoded on a "per stream" basis using the appropriate technology to align with the decoder located at the receiver which requested the stream. In one exemplary aspect, the encoder 140 can receive the media content directly from the media capturing devices (e.g., cameras 21A and 21B) rather than as encoded signals from encoders 120A and 120B.

Finally, the video control center 130, based on the command instructions issued by the technical director 12 using the video production equipment 11 (e.g., the video switcher controller), provides control decisions that need to be time aligned to the media streams, which are then mutually time aligned at the point of production, in time alignment and processing component 150, which can be located at the venue 10, for example, in a production truck 10 or, alternatively, in the cloud, for example. The time alignment and processing component 150 also receives the high resolution signals from standard encoder 140 and is configured to generate the video production, i.e., the live video broadcast production. In other words, although not shown, the production truck 10 can be communicatively coupled to one or a plurality of remote distribution nodes, which may distribute the video production using existing distribution techniques to end consumer devices, including a final feedback to the video control center 130 (shown as the high resolution signal being transmitted from production 10 to video control center 130).

Thus, according to the exemplary system, the cameras (e.g., cameras 21A and 21B) with encoders 120A and 120B are configured to generate a low latency proxy stream with minimal bandwidth constraints. As a result, the technical director 12 located at a control center 130 remote to the venue 10 can make editorial decisions using the video switcher that are essentially in real-time (e.g., 100 to 200 millisecond latency, or shorter) because the low latency signals are received with minimal delay. Moreover, the system 100 provides full resolution output of the video broadcast while enabling the remote control center 130 to edit the show using the proxy content received from encoders 120A and 120B, while simultaneously controlling the full resolution production equipment (e.g., time alignment and processing component 150) at the venue 10. For example, using existing production equipment using the disclosed method, a production environment could provide for a 4K production with, for example, six cameras, four channels of replay and two channels of graphics, using minimal outgoing bandwidth Moreover, according to alternative embodiments, the actual video production engine can be located anywhere, such as a central production facility or data center, for example. Either embodiment would also greatly reduce the required production crew personnel at the venue.

Based on the exemplary system, requirements for workflows and applications can be satisfied, by including the perception of virtualization. In general, virtualization uses time shifting and masking techniques to provide the illusion of real time. In other words, virtual reality relies on providing an immersive experience to recreate the necessary senses, in the correct combination, to optimize the virtual experience. In this instance, if the technical director's senses are correctly immersed, the entire control room environment may be time shifted from real-time without affecting their user experience and perception. Thus, according to the exemplary embodiment, because the technical director's virtual experience is time-shifted by a small amount, then the end users experience may be substantially time shifted from that of the technical director.

In the live video production environment, it is important to tie the virtual reality experience together with the use of timestamps and system timing. Often in broadcast facilities, there is a tendency to time the entire plant exactly. However, designing for tight time alignment may achieve gains where it makes sense for the generation of that media production and the intended use of that product. Precision time protocol (PTP) and real-time transport protocol (RTP) time stamps provide the ability to do this, and, in fact can eliminate frame syncs, save cost and simplify facility design. The technical director's virtual environment generates control sequences that can also be time stamped, which are transmitted as control decisions (e.g., which stream to use for live video broadcast and the timing for when to switch between signals) from the video control center 130 to the time align and processing component 150 in production truck 10. These command signals enable the mutual alignment of media and control to ensure the desired production is carried out, based on real time decisions, but at some arbitrary later point in time that can be a measured or preset offset. This same logic is applied to the technical director's experience, except that their offset, measured or preset, can be set to much less than that of the production media since the media signal are transmitted as high speed proxy signals to the video control center 130.

However, it is very difficult to create a perception of virtual reality for live video production, with the regards to timing, as live video production has the most critical time constraints due to having close proximity to the actual live events that are being captured. Thus, exact timing, without perceived delay, is essential and must be precisely maintained to ensure the perception that the captured media event is happening in real time. Accordingly, the transport and processing of video and audio signals must maintain tight timing in order to ensure lip sync between audio and video and ensure audio feed back to the live announcers is occurring within human perception of real time. In order to manage these tight timings, delays need to be strictly managed and minimized, with the smallest buffers necessary used to help keep delays to a minimum to manage the human factor of the media content capture process. Moreover, frame syncs have to be reduced or eliminated within the processing chain, saving their use for the edge if needed, in order to keep tight timing.

Referring back to the timing diagram shown in FIG. 3 and the remote system shown in FIG. 1, the virtualization effect from the perspective of the end consumer is lost due to the length in time of the control signal $T_{control}$ from the video switcher back to the media capture devices, such as the cameras. In other words, conventional remote live broadcast environments, for example, as shown in FIG. 1, inherently have significant latency between the actual real-time event and when the technical director 12 makes the editorial decisions due to the bandwidth limitations at the venue, for example. The unacceptable delay in the generation and transmission of the control signals back to media capture devices creates a delay that can be perceived by the end consumer, especially if the end user is consuming the live event using two separate channels, broadcasts, etc. In other words, by the time the technical director makes an editorial decision using the video switcher, many significant events could have occurred during the actual event. Thus, the end consumer loses the virtualization effect. However, if the time delay $T_{control}$ of the control signals can be minimized, the remaining delay periods $T_i$ in the production chain become irrelevant from the perspective of the operators and/or end users. Thus, as long as each timing phase for all media (video and audio) is coherent in time, each individual will consume the content as if in real time, and all latencies, proxies, etc., will be tolerated from the perspective of the individual's perception.

Advantageously, the disclosed system effectively minimizes the time delay $T_{control}$ of the control signal by providing high speed proxy signals of the media streams to the video control center 130 enabling the technical director 12 to make editorial decisions very close to real time. As described above, these low latency proxy signals can be generated using object detection rather than encoding the full high resolution signals. As a result, the disclosed design preferably provides a latency below 100 to 200 milliseconds, or less. Therefore, the time delay $T_{control}$ of the control signal can be minimized (assuming the editorial decision is made quickly by the technical director). In other words, the high speed media proxies are preferably generated by encoders 120A and 120B and transmitted to the control center 130 within 200 milliseconds from media content capture by the plurality of cameras 21A and 21B. As a result, the multi-view interface can effectively create a virtual reality environment for the technical director 12 of the live video broadcast production when responding generating the control instructions to control the capture of the media content by the plurality of cameras 21A and 21B. Due to the low latency proxy signals, the system and method disclosed herein enables the user (e.g., the technical director 12) to receive the captured content and the control center and make control decisions in close to real time as possible. As a result, the technical director 12 is able to control cameras 21A and 21B to capture and modify content capture with minimized delay between the actual live event and the controlled content capture.

All subsequent delays affecting production and transport of the high quality signal that is ultimately consumed by the end user devices is irrelevant as the user will still perceive the live event to be presented in real time. In other words, there is nothing wrong with incremental delay, and latency variations between timing domains can, in fact, help eliminate the additional and significant latency introduced by frame synchronizers. Thus, there is no downside created by the disclosed system, provided that where observation is necessary, all media (video and audio) is aligned. However, there is the benefit that observation may be pipelined along with the media itself, providing advantages for remote production as described above. In the cases where programmatic workflows can be managed by exception, time alignment at the final point of signal distribution is effective. Finally, to ensure that time budgets for the facility can accommodate the latency associated with signal processing, and device virtualization, transport mechanisms with the smallest buffers are preferably used to provide the lowest incremental latency.

According to an exemplary aspect, the disclosed system can provide a true cloud based data center using emerging, low latency streaming technologies. As a result, the once "on-site production" control room (e.g., a production truck described above) can effectively become a proxy that can be located anywhere provided the delay associated with original content delivery is acceptable.

Figure 4B:
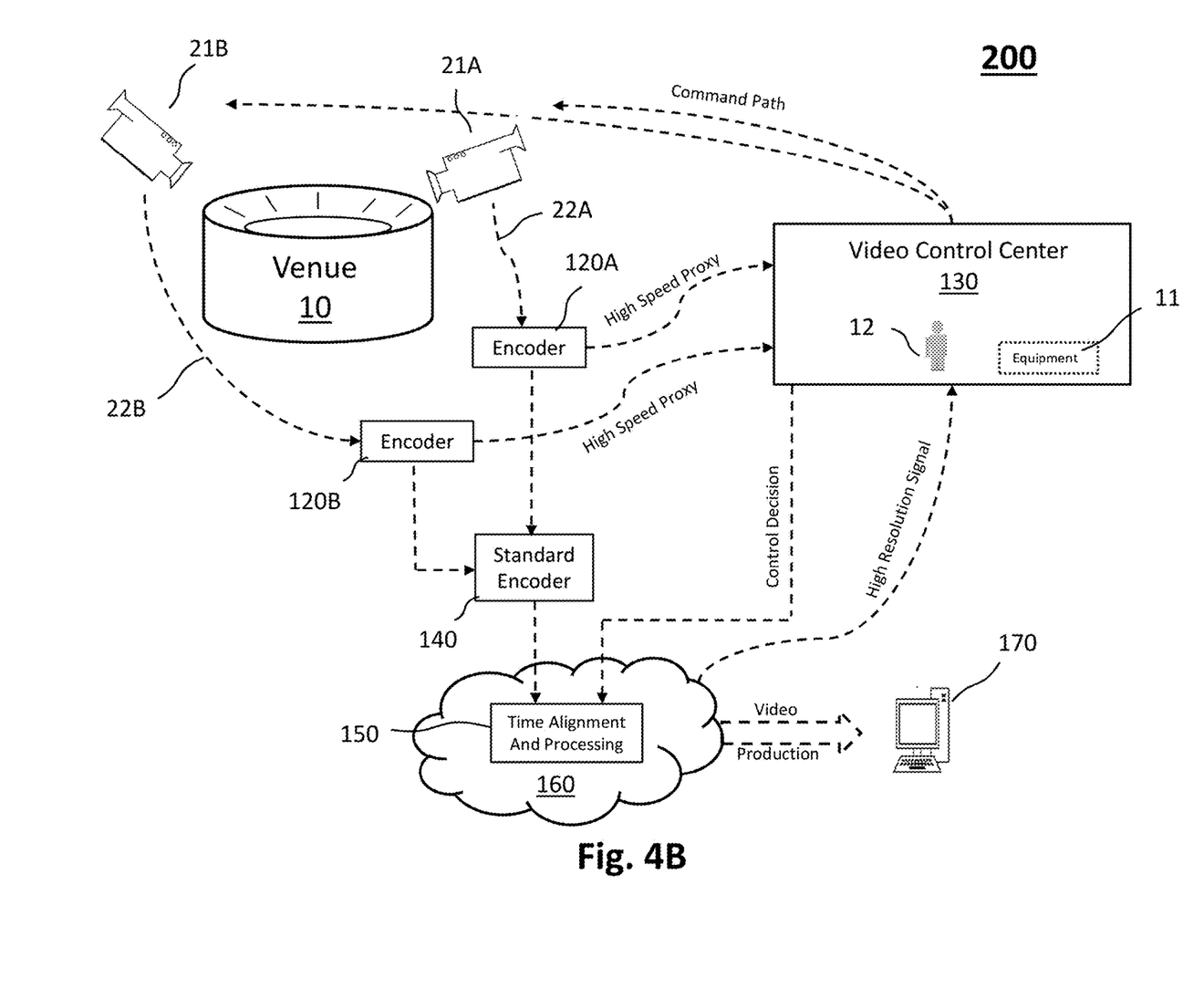
FIG. 4B illustrates a block diagram of a system for controlling media content capture for live television production according to another exemplary embodiment.

FIG. 4B illustrates a block diagram of a system for controlling media content capture for live television production according to another exemplary embodiment. As shown, many of the components utilized in system 200 are the same as those components described above with respect to FIG. 4A and will not be repeated herein. However, the exemplary system shown utilizes the low latency streaming technologies to provide a true cloud-based production environment. Generally speaking, the cloud 160 can be considered Internet-based computing that provides shared computer processing resources and data to computers and other devices on demand. For example, in one embodiment, the system 200 can utilize public cloud services, such Amazon Web Services (AWS), Microsoft and Google, who own and operate the infrastructure at their data center and providing access to computing resources via the Internet.

Thus, according to this exemplary embodiment, the time alignment and processing components 150 (described above) can be moved to the cloud computing services to perform the final processing steps for the live video broadcast production. As shown, the video production can be encoded and transmits by the Internet, for example, to end consumer devices 170, such as computing devices, televisions, set-top boxes, tablets, and the like. This environment can utilize the same fast transfer technology discussed above to transmit the high bandwidth media streams as well, including transmitting the high resolution signals back to the remotely located video control center.

Figure 5:
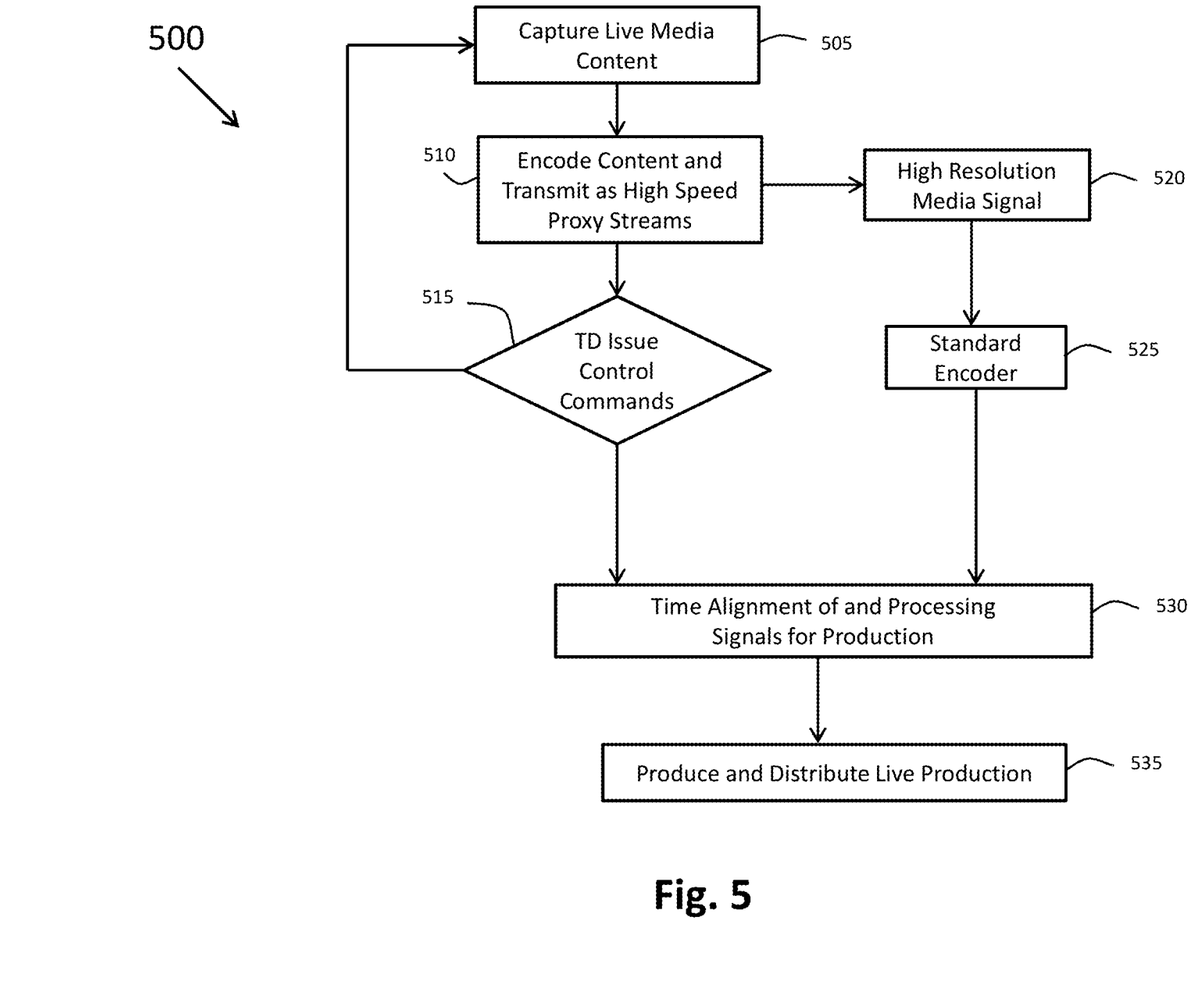
FIG. 5 illustrates a conceptual flow diagram of a method for bending time of live television production according to an exemplary embodiment.

FIG. 5 illustrates a conceptual flow diagram of a method for bending time of live television production according to an exemplary embodiment. It is noted that the exemplary method can be implemented using the systems described above. Thus, the following description will make reference to the components of the exemplary system.

As shown, initially at step 505, cameras (e.g., cameras 21A and 21B) located at a venue, such as a sports stadium or the like, are configured to capture media content of the live scene in real time. The cameras are communicatively coupled to one or a plurality of encoders that receive the media content as data streams and are configured to encode the content and transmit the encoded media streams at step 510 as high speed, low latency proxy streams to a remote control center, for example. As described above, these low latency proxy streams are received at the control center with very little delay and can be presented on a multi-viewer interface to a technical director or other such user that can make artistic and editorial command decisions that can be transmitted back to the cameras as control decisions. Concurrently (or close to real time), based on the command signals the cameras continue to capture media content, which is processed as a high resolution media signal at step 520 and transmitted to a standard encoder at step 525, which can be located at the venue or at an independent production site, for example.

Furthermore, the high resolution media signal is provided to a time alignment device at step 530, which also receives control comments from issued by the technical director. Using appropriate time alignment processing, based on PTP and RTP signals, for example, a final production of the broadcast where it is produced and distributed as a live video broadcast at step 535.

It should be appreciated that the above-noted components may be implemented using a combination of both hardware and software. Accordingly, in one or more example aspects, the functions described may be implemented in hardware, software, firmware, or any combination thereof.

Moreover, while aspects have been described in conjunction with the example implementations outlined above, various alternatives, modifications, variations, improvements, and/or substantial equivalents, whether known or that are or may be presently unforeseen, may become apparent to those having at least ordinary skill in the art. Accordingly, the example implementations of the invention, as set forth above, are intended to be illustrative, not limiting. Various changes may be made without departing from the spirit and scope of the aspects. Therefore, the aspects are intended to embrace all known or later-developed alternatives, modifications, variations, improvements, and/or substantial equivalents.

Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

By way of example and without limitation, the aspects of the present disclosure are presented with reference to systems and methods used to configure various components of a video production system that may be used for production of television programming or at sports events. The various concepts presented throughout this disclosure may be implemented across a broad variety of imaging applications, including systems that capture and process video and/or still images, video conferencing systems and so on. It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. All structural and functional equivalents to the elements of the various aspects described throughout this disclosure that are known or later come to be known to those of ordinary skill in the art are expressly incorporated herein by reference and are intended to be encompassed by the claims.

What is claimed:

1. A system for controlling media content capture for live video broadcast production, the system comprising:
   a media content capture device configured to capture original media content at a live event location and generate an original captured media content stream of the original media content captured at the live event location;
   a media capture control encoder configured to encode the original captured media content stream to generate an original media content proxy for the original captured media content;
   a remote media production center located remotely from the live event location and comprising:
      a remote media stream receiver configured to receive the original media content proxy from the media capture control encoder; and
      a remote video switch controller configured to generate a media content capture operation to control capture of the original media content at the live event location by the media content capture device, and to transmit the media content capture operation to the media content capture device to control an operation thereof to capture the original media content at the live event location;
   a broadcast production encoder located at the live event location and configured to encode, as a broadcast media stream, the original captured media content stream generated by the media content capture device controlled by the media content capture operation; and
   a media broadcast production system configured to receive the encoded broadcast media stream from the broadcast production encoder and to produce a broadcast production video stream by applying broadcast production commands from the remote media production center to the received and encoded broadcast media stream, such that the broadcast production video stream is configured to be displayed on an end user device;
   wherein the media capture control encoder is configured to encode the original captured media content stream to be transmitted to the remote media production center during a first time horizon;
   wherein the remote video switch controller is configured to transmit the media content capture operation to the media content capture device in a second time horizon that is different from and subsequent to the first time horizon;
   wherein the broadcast production encoder is configured to transmit the encoded broadcast media stream to the media broadcast production system in a third time horizon that is different from and subsequent to the second time horizon such that the encoded broadcast media stream is configured for broadcast production as the broadcast production video stream in the third time horizon; and
   wherein the remote video switch controller is further configured to bend time of the broadcast production so as to control the media broadcast production system to generate a complete video broadcast production from the broadcast production video stream in the third time horizon without requiring any additional video production processing of the broadcast production video stream in a fourth time horizon subsequent to the third time horizon.

2. The system according to claim 1,
   wherein the media content capture device is a camera configured to captured live video as the original media content;
   wherein the media content capture operation is a remote camera control operation signal configured to control the camera so as to physically capture the original media content at the live event location; and
   wherein the remote camera control operation includes a zoom and pan operation of the camera.

3. The system according to claim 2, wherein the remote camera control operation signal is configured to control the camera so as to physically capture the original media content at the live event location without modifying the original media content by controlling a cut operation after the original media content has been captured by the camera at the live event location in response to the remote camera control operation signal.

4. The system according to claim 1,
wherein the media capture control encoder is configured to encode the original captured media content stream at a first resolution to generate the original media content proxy for the original captured media content; and
wherein the broadcast production encoder is configured to encode the original captured media content stream at a second resolution that is higher than a first resolution used for the original media content proxy.

5. The system according to claim 4, wherein the remote media production center further includes a remote multi-view interface configured to display proxy media content that corresponds to the generated original media content proxy; and the remote video switch controller is further configured to generate the media content capture operation in response to a remote user input via the remote multi-view interface.

6. The system according to claim 5, wherein the remote media stream receiver is further configured to perform object-based analysis of the original media content proxy, such that the remote multi-view interface displays the proxy media content as avatars based on spatial orientation and relative motion of detected objects in the original captured media content stream based on the performed object-based analysis.

7. The system according to claim 1, wherein the broadcast production encoder is configured to transmit the encoded broadcast media stream to the media broadcast production system without transmitting the encoded broadcast media stream to a live event video switch controller located at the live event location that shadows the remote video switch controller located at the remote control center.

8. The system according to claim 1,
wherein the first time horizon starts when the media content capture device captures the original media content at the live event location and ends when the media capture control encoder transmits the encoded media stream to the remote media production center located remotely from the live event location;
wherein the second time horizon starts when the remote media stream receiver receives the original media content proxy and ends when the remote video switch controller transmits the media content capture operation to the media content capture device;
wherein the third time horizon starts when the broadcast production encoder encodes the original captured media content stream generated by the media content capture device as the broadcast media stream and ends when the media broadcast production system generates the complete video broadcast production; and
wherein the broadcast production encoder is configured to transmit the encoded broadcast media stream to the media broadcast production system in the third time horizon such that the encoded broadcast media stream is configured for video broadcast production in the third time horizon without any additional required video production processing of the encoded broadcast media stream in the fourth time horizon that is different from and subsequent to the third time horizon.

9. The system according to claim 1, wherein the remote video switch controller is further configured to bend time of the broadcast production by generating the broadcast production commands as a video production control sequence that includes timestamps that are configured to align the encoded broadcast media stream so as to generate the complete video broadcast production from the broadcast production video stream in the third time horizon without requiring any additional video production processing of the encoded broadcast media stream in the fourth time horizon.

10. The system according to claim 1, wherein the media broadcast production system comprises a video broadcast production truck located at the live event location.

11. The system according to claim 1, wherein the media broadcast production system comprises a cloud computing environment.

12. A system for controlling media content capture for live video broadcast production, the system comprising:
a media content capture device configured to capture original media content at a live event location and generate an original captured media content stream of the original media content captured at the live event location;
a media capture control encoder configured to encode the original captured media content stream to generate an original media content proxy for the original captured media content;
a remote media production center located remotely from the live event location and including a remote video switch controller configured to generate a media content capture operation to control capture of the original media content at the live event location by the media content capture device, and to transmit the media content capture operation to the media content capture device to control an operation thereof to capture the original media content at the live event location;
a broadcast production encoder configured to encode, as a broadcast media stream, the original captured media content stream generated by the media content capture device controlled by the media content capture operation; and
a media broadcast production system configured to receive the encoded broadcast media stream from the broadcast production encoder and to produce a broadcast production video stream by applying broadcast production commands from the remote media production center to the received and encoded broadcast media stream, such that the broadcast production video stream is configured to be displayed on an end user device;
wherein the media broadcast production system is configured to bend time by aligning the broadcast production video stream based on timestamps included in a production control sequence in the broadcast production commands to generate a video broadcast production without requiring any additional video production processing of the broadcast production video stream at the remote media production center,
wherein the media capture control encoder is configured to encode the original captured media content stream to be transmitted to the remote media production center during a first time horizon;
wherein the remote video switch controller is configured to transmit the media content capture operation to the media content capture device in a second time horizon that is different from and subsequent to the first time horizon;

wherein the broadcast production encoder is located at the live event location and is configured to transmit the encoded broadcast media stream to the media broadcast production system in a third time horizon that is different from and subsequent to the second time horizon such that the encoded broadcast media stream is configured for broadcast production as the broadcast production video stream in the third time horizon; and wherein the remote video switch controller is further configured to bend time of the broadcast production so as to generate the video broadcast production in the third time horizon without requiring any additional video production processing of the encoded broadcast media stream in a fourth time horizon subsequent to the third time horizon.

13. The system according to claim 12, wherein the first time horizon starts when the media content capture device captures the original media content at the live event location and ends when the media capture control encoder transmits the encoded media stream to the remote media production center located remotely from the live event location;

wherein the second time horizon starts when the remote media stream receiver receives the original media content proxy and ends when the remote video switch controller transmits the media content capture operation to the media content capture device;

wherein the third time horizon starts when the broadcast production encoder encodes the original captured media content stream generated by the media content capture device as the broadcast media stream and ends when the media broadcast production system generates the video broadcast production; and wherein the broadcast production encoder is configured to transmit the encoded broadcast media stream to the media broadcast production system in the third time horizon such that the encoded broadcast media stream is configured for video broadcast production in the third time horizon without any additional required video production processing of the encoded broadcast media stream in the fourth time horizon that is different from and subsequent to the third time horizon.

14. The system according to claim 12, wherein the media content capture device is a camera configured to captured live video as the original media content;

wherein the media content capture operation is a remote camera control operation signal configured to control the camera so as to physically capture the original media content at the live event location; and wherein the remote camera control operation includes a zoom and pan operation of the camera.

15. The system according to claim 14, wherein the remote camera control operation signal is configured to control the camera so as to physically capture the original media content at the live event location without modifying the original media content by controlling a cut operation after the original media content has been captured by the camera at the live event location in response to the remote camera control operation signal.

16. The system according to claim 12, wherein the media capture control encoder is configured to encode the original captured media content stream at a first resolution to generate the original media content proxy for the original captured media content; and wherein the broadcast production encoder is configured to encode the original captured media content stream at a second resolution that is higher than a first resolution used for the original media content proxy.

17. The system according to claim 16, wherein the remote media production center further includes:

a remote media stream receiver configured to receive the original media content proxy from the media capture control encoder; and a remote multi-view interface configured to display proxy media content that corresponds to the generated original media content proxy; and the remote video switch controller is further configured to generate the media content capture operation in response to a remote user input via the remote multi-view interface.

18. The system according to claim 17, wherein the remote media stream receiver is further configured to perform object-based analysis of the original media content proxy, such that the remote multi-view interface displays the proxy media content as avatars based on spatial orientation and relative motion of detected objects in the original captured media content stream based on the performed object-based analysis.

19. The system according to claim 12, wherein the broadcast production encoder is configured to transmit the encoded broadcast media stream to the media broadcast production system without transmitting the encoded video broadcast media stream to a live event video switch controller located at the live event location that shadows the remote video switch controller located at the remote control center.

20. The system according to claim 12, wherein the media broadcast production system comprises a video broadcast production truck located at the live event location.

21. The system according to claim 12, wherein the media broadcast production system comprises a cloud computing environment.

22. A system for controlling media content capture for live video broadcast production, the system comprising:

a media content capture device configured to capture original media content at a live event location and generate an original captured media content stream of the original media content captured at the live event location;

a media capture control encoder configured to encode the original captured media content stream to generate an original media content proxy for the original captured media content;

a remote media production center located remotely from the live event location and including a remote video switch controller configured to generate a media content capture operation to control capture of the original media content at the live event location by the media content capture device, and to transmit the media content capture operation to the media content capture device to control an operation thereof to capture the original media content at the live event location;

a broadcast production encoder configured to encode, as a broadcast media stream, the original captured media content stream generated by the media content capture device controlled by the media content capture operation; and a media broadcast production system configured to receive the encoded broadcast media stream from the broadcast production encoder and to produce a broadcast production video stream by applying broadcast production commands to the received and encoded broadcast media stream, such that the broadcast production video stream is configured to be displayed on an end user device;

wherein the media broadcast production system is configured to bend time by aligning the broadcast production video stream based on timestamps included in a production control sequence in the broadcast production commands to generate a video broadcast production without requiring any additional video production processing of the broadcast production video stream at the remote media production center; and wherein the media broadcast production system is still further configured to bend time of the broadcast production so as to generate the video broadcast production without requiring that the timestamps of the video production control sequence be generated at the remote media production center, wherein the media capture control encoder is configured to encode the original captured media content stream to be transmitted to the remote media production center during a first time horizon;

wherein the remote video switch controller is configured to transmit the media content capture operation to the media content capture device in a second time horizon that is different from and subsequent to the first time horizon;

wherein the broadcast production encoder is located at the live event location and is configured to transmit the encoded broadcast media stream to the media broadcast production system in a third time horizon that is different from and subsequent to the second time horizon such that the encoded broadcast media stream is configured for broadcast production as the broadcast production video stream in the third time horizon; and wherein the remote video switch controller is further configured to bend time of the broadcast production so as to generate the video broadcast production in the third time horizon without requiring any additional video production processing of the encoded broadcast media stream in a fourth time horizon subsequent to the third time horizon.

23. The system according to claim 22, wherein the first time horizon starts when the media content capture device captures the original media content at the live event location and ends when the media capture control encoder transmits the encoded media stream to the remote media production center located remotely from the live event location;

wherein the second time horizon starts when the remote media stream receiver receives the original media content proxy and ends when the remote video switch controller transmits the media content capture operation to the media content capture device;

wherein the third time horizon starts when the broadcast production encoder encodes the original captured media content stream generated by the media content capture device as the broadcast media stream and ends when the media broadcast production system generates the video broadcast production; and wherein the broadcast production encoder is configured to transmit the encoded broadcast media stream to the media broadcast production system in the third time horizon such that the encoded broadcast media stream is configured for video broadcast production in the third time horizon without any additional required video production processing of the encoded broadcast media stream in the fourth time horizon that is different from and subsequent to the third time horizon.

24. The system according to claim 22, wherein the media content capture device is a camera configured to captured live video as the original media content;

wherein the media content capture operation is a remote camera control operation signal configured to control the camera so as to physically capture the original media content at the live event location; and wherein the remote camera control operation includes a zoom and pan operation of the camera.

25. The system according to claim 24, wherein the remote camera control operation signal is configured to control the camera so as to physically capture the original media content at the live event location without modifying the original media content by controlling a cut operation after the original media content has been captured by the camera at the live event location in response to the remote camera control operation signal.

26. The system according to claim 22, wherein the media capture control encoder is configured to encode the original captured media content stream at a first resolution to generate the original media content proxy for the original captured media content; and wherein the broadcast production encoder is configured to encode the original captured media content stream at a second resolution that is higher than a first resolution used for the original media content proxy.

27. The system according to claim 26, wherein the remote media production center further includes:

a remote media stream receiver configured to receive the original media content proxy from the media capture control encoder; and a remote multi-view interface configured to display proxy media content that corresponds to the generated original media content proxy; and the remote video switch controller is further configured to generate the media content capture operation in response to a remote user input via the remote multi-view interface.

28. The system according to claim 27, wherein the remote media stream receiver is further configured to perform object-based analysis of the original media content proxy, such that the remote multi-view interface displays the proxy media content as avatars based on spatial orientation and relative motion of detected objects in the original captured media content stream based on the performed object-based analysis.

29. The system according to claim 22, wherein the broadcast production encoder is configured to transmit the encoded broadcast media stream to the media broadcast production system without transmitting the encoded video broadcast media stream to a live event video switch controller located at the live event location that shadows the remote video switch controller located at the remote control center.

30. The system according to claim 22, wherein the media broadcast production system comprises a video broadcast production truck located at the live event location and configured to receive the broadcast production commands transmitted from the remote media production center.

31. The system according to claim 22, wherein the media broadcast production system comprises a cloud computing environment and configured to receive the broadcast production commands transmitted from the remote media production center.

* * * * *